United States Patent
Zeng et al.

(10) Patent No.: US 11,395,282 B2
(45) Date of Patent: Jul. 19, 2022

(54) CELLULAR BURST DETECTION IN UNLICENSED SPECTRUM

(71) Applicant: Apple Inc., Cupertino, CA (US)

(72) Inventors: Wei Zeng, San Diego, CA (US); Yuchul Kim, Santa Clara, CA (US); Jia Tang, San Jose, CA (US); Dawei Zhang, Saratoga, CA (US); Tianyan Pu, Cupertino, CA (US); Wei Zhang, Santa Clara, CA (US); Haitong Sun, Irvine, CA (US)

(73) Assignee: Apple Inc., Cupertino, CA (US)

( * ) Notice: Subject to any disclaimer, the term of this patent is extended or adjusted under 35 U.S.C. 154(b) by 218 days.

(21) Appl. No.: 16/789,356

(22) Filed: Feb. 12, 2020

(65) Prior Publication Data

US 2020/0267699 A1 Aug. 20, 2020

Related U.S. Application Data

(60) Provisional application No. 62/806,022, filed on Feb. 15, 2019.

(51) Int. Cl.
*H04W 72/04* (2009.01)
*H04W 48/16* (2009.01)
*H04W 16/14* (2009.01)

(52) U.S. Cl.
CPC ......... *H04W 72/042* (2013.01); *H04W 16/14* (2013.01); *H04W 48/16* (2013.01)

(58) Field of Classification Search
CPC .... H04W 72/042; H04W 16/14; H04W 48/16
See application file for complete search history.

(56) References Cited

U.S. PATENT DOCUMENTS

| 9,867,070 B2 | 1/2018 | Luo |
| 10,123,214 B2 | 11/2018 | Egner |

(Continued)

FOREIGN PATENT DOCUMENTS

| CN | 103493549 A | 1/2014 |
| CN | 107534499 A | 1/2018 |

(Continued)

OTHER PUBLICATIONS

First Office Action CN Patent Application No. 202010093576.2; 10 pages; dated Dec. 3, 2021.

(Continued)

*Primary Examiner* — Michael J Moore, Jr.
(74) *Attorney, Agent, or Firm* — Kowert, Hood, Munyon, Rankin & Goetzel, P.C.

(57) ABSTRACT

This disclosure relates to performing detection of burst cellular communication in unlicensed spectrum. A wireless device may establish a cellular link with a cellular base station, which may provide a first cell deployed on an unlicensed frequency channel. The wireless device may receive a transmission from a second cell. The second cell may not be a serving cell of the wireless device. The transmission may be received on at least a portion of the unlicensed frequency channel. The wireless device may decode a channel occupancy time field of the transmission from the second cell. The wireless device may determine a channel occupancy time of the transmission from the second cell based at least in part on the channel occupancy time field.

20 Claims, 9 Drawing Sheets

(56) References Cited

U.S. PATENT DOCUMENTS

| | | | |
|---|---|---|---|
| 10,529,220 | B2 | 1/2020 | Atkins |
| 10,536,936 | B2 | 1/2020 | Park |
| 2019/0090218 | A1 | 3/2019 | Noh |
| 2019/0141695 | A1 | 5/2019 | Babaei |
| 2019/0306923 | A1 | 10/2019 | Xiong |
| 2019/0313383 | A1* | 10/2019 | Xiong ................. H04W 72/042 |
| 2019/0349991 | A1 | 11/2019 | Mukherjee |
| 2019/0363843 | A1 | 11/2019 | Gordaychik |
| 2020/0037354 | A1* | 1/2020 | Li .......................... H04L 5/1469 |
| 2020/0045696 | A1* | 2/2020 | Huang .................. H04W 16/14 |
| 2020/0146058 | A1* | 5/2020 | Xu ......................... H04L 5/0092 |
| 2020/0229157 | A1* | 7/2020 | Rastegardoost ...... H04L 5/0048 |
| 2021/0058964 | A1* | 2/2021 | Hooli .................. H04W 74/008 |
| 2021/0076418 | A1* | 3/2021 | Schober .............. H04W 74/006 |
| 2022/0078841 | A1* | 3/2022 | Tiirola .............. H04W 74/0808 |
| 2022/0104260 | A1* | 3/2022 | Wang ............... H04W 74/0866 |

FOREIGN PATENT DOCUMENTS

| | | | | |
|---|---|---|---|---|
| WO | WO 2019/143937 A1 | 7/2019 | | |
| WO | WO-2019143937 A1 * | 7/2019 | | |
| WO | WO 2019/245779 A1 | 12/2019 | | |
| WO | WO-2020088775 A1 * | 5/2020 | ........ | H04W 72/0453 |

OTHER PUBLICATIONS

Ericsson "On the use of a preamble for NR-U", 3GPP TSG-RAN WG1 Meeting #95 R1-1814021; Spokane, USA; 15 pages; Nov. 12-16, 2018.

Motorola Mobility et al. "Feature lead summary for NR-U DL Signals and Channels", 3GPP TSG-RAN WG1 Meeting 95 R1-1814035; Spokane, UDA; 18 pages; Nov. 12-16, 2018.

* cited by examiner

FIG. 8

Example UE-Specific SFI Table

| SFI | Slot Formats |
|---|---|
| 1 | 28, 28, 28, 28, 34 |
| 2 | 28, 28, 28, 34, 34 |
| 3 | 28, 34, 34, 34, 34 |
| ... | ... |

FIG. 9

CELLULAR BURST DETECTION IN UNLICENSED SPECTRUM

PRIORITY INFORMATION

This application claims priority to U.S. provisional patent application Ser. No. 62/806,022, entitled "Cellular Burst Detection in Unlicensed Spectrum," filed Feb. 15, 2019, which is hereby incorporated by reference in its entirety as though fully and completely set forth herein.

FIELD

The present application relates to wireless communications, and more particularly to systems, apparatuses, and methods for performing detection of burst cellular communication in unlicensed spectrum.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (e.g., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

In addition to the communication standards mentioned above, there also exist extensions aimed at boosting transmission coverage in certain cellular networks. For example, LTE in Unlicensed spectrum (LTE-U) allows cellular carriers to boost coverage in their cellular networks by transmitting in the unlicensed 5 GHz band, which is also used by many Wi-Fi devices. Licensed Assisted Access (LAA) describes a similar technology aimed to standardize operation of LTE in the Wi-Fi bands through the use of a contention protocol referred to as listen-before-talk (LBT), which facilitates coexistence with other Wi-Fi devices on the same band. As another example, NR-U is a technology under development that is intended to provide support for performing 5G NR cellular communication in unlicensed spectrum. However, operating in unlicensed spectrum presents unique challenges, e.g., in comparison to operating in licensed spectrum. Accordingly, improvements in the field are desired.

SUMMARY

Embodiments are presented herein of apparatuses, systems, and methods for performing detection of burst cellular communication in unlicensed spectrum.

According to the techniques described herein, a cellular base station that deploys a cell in unlicensed spectrum may provide a channel occupancy time indication when performing a cellular burst transmission on the cell.

The channel occupancy time indication may be provided in a manner such that wireless devices that are not part of the serving set of the cell can receive and decode the indication. For example, the channel occupancy time indication may be provided in a portion of a transmission that can be received using cell identification information for the cell.

Accordingly, a wireless device that is operating on the same frequency channel (e.g., that is attached to a different cell) may be able to receive and decode at least the portion of the transmission that includes the channel occupancy time indication, and so to determine the channel occupancy time for the transmission.

The wireless device may (e.g., periodically) perform a search for other cells deployed on the same frequency channel as its serving cell, for example to obtain identification information and synchronization information for potentially interfering cells. This may in turn facilitate the reception and decoding of the channel occupancy time indications included in the tranmsissions by such potentially interfering cells.

When the wireless device receives and decodes a channel occupancy time indication for a cell that is not its serving cell, the wireless device may determine whether and for how long to skip control channel decoding for its serving cell based at least in part on the channel occupancy time indication. Note that at least in some instances, interference measurements for the potentially interfering cell may also be considered when determining whether to skip control channel decoding for its serving cell.

Thus, a wireless device implementing the techniques described herein may be able to avoid performing control channel decoding in at least some instances, such as when interference from another cell would prevent use of the serving cell of the wireless device that is deployed on the same unlicensed frequency channel. In other words, the techniques described herein may assist a wireless device operating in unlicensed spectrum to reduce its power consumption, potentially with little or no impact to the ability of the wireless device to communicate with its serving cell, at least according to some embodiments.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 8 illustrates a portion of an exemplary possible slot format table that could be used in conjunction with 5G NR cellular communication, according to some embodiments;

FIG. 9 illustrates a portion of an exemplary possible slot format indicator table that could be used in conjunction with 5G NR cellular communication, according to some embodiments.

Figure 1:
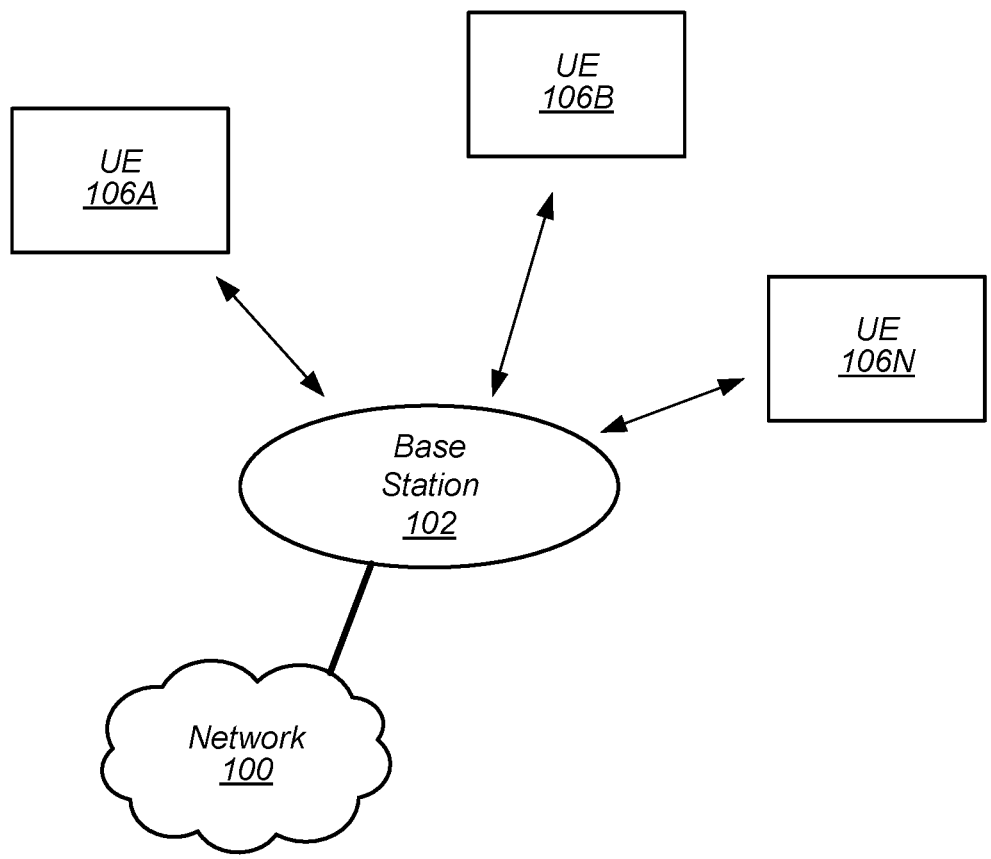
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Acronyms

Various acronyms are used throughout the present disclosure. Definitions of the most prominently used acronyms that may appear throughout the present disclosure are provided below:

UE: User Equipment
RF: Radio Frequency
BS: Base Station
GSM: Global System for Mobile Communication
UMTS: Universal Mobile Telecommunication System
LTE: Long Term Evolution
NR: New Radio
NR-U: NR-Unlicensed
LTE-U: LTE-Unlicensed
LAA: Licensed Assisted Access
TX: Transmission/Transmit
RX: Reception/Receive
LAN: Local Area Network
WLAN: Wireless LAN
LBT: Listen-Before-Talk
AP: Access Point
RAT: Radio Access Technology
IEEE: Institute of Electrical and Electronics Engineers
Wi-Fi: Wireless Local Area Network (WLAN) RAT based on the IEEE 802.11 standards

Terms

The following is a glossary of terms that may appear in the present application:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g. in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
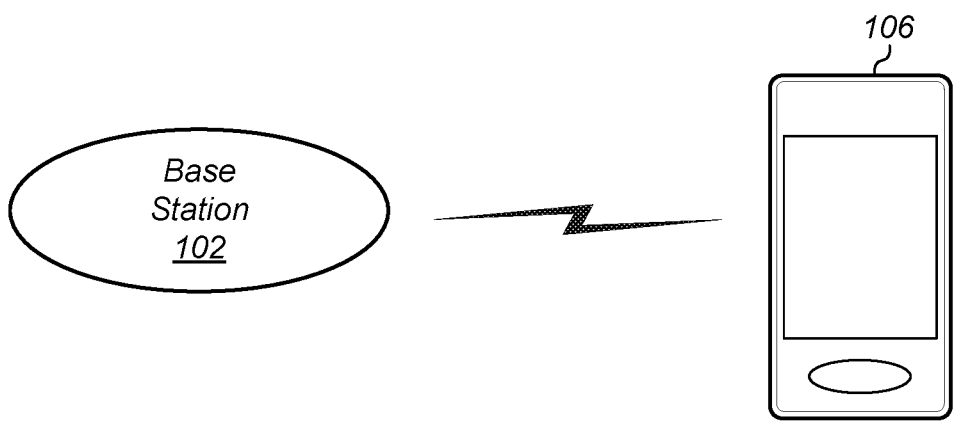
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB'. If the base station 102 is implemented in the context of NR, it may alternately be referred to as a 'gNodeB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, NR, NR-U, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). In some embodiments, the UE 106 may be configured to implement techniques for performing detection of burst cellular communication in unlicensed spectrum, at least according to the various methods as described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an exemplary user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or GSM, or LTE or NR), and separate radios for communicating using each of Wi-Fi and BLUETOOTH™. Other configurations are also possible.

Figure 3:
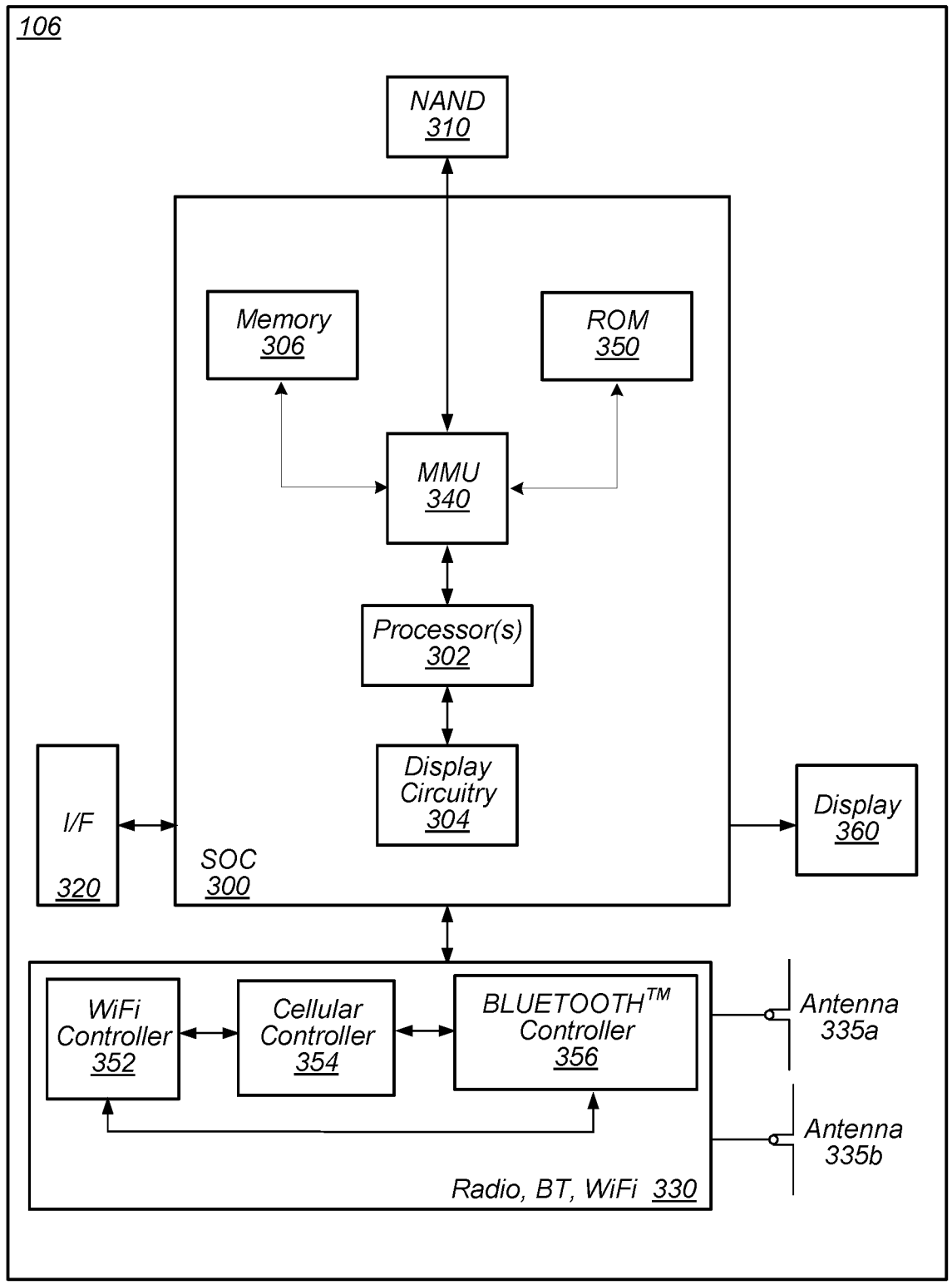
FIG. 3 illustrates an exemplary block diagram of a UE, according to some embodiments.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, NFC, GPS, etc.).

The UE device 106 may include at least one antenna (e.g. 335a), and possibly multiple antennas (e.g., illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for performing detection of burst cellular communication in unlicensed spectrum. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to provide coexistence features for cellular communication in unlicensed spectrum according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g., LTE controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing Wi-Fi preamble detection, e.g., for detecting Wi-Fi physical layer preambles transmitted in unlicensed frequency bands that might be relevant to possible communication by the UE 106. As another possibility, the cellular controller 354 may include hardware and/or software components for generating Wi-Fi physical layer preamble signals, e.g., for transmitting as part of uplink communications by the UE 106 that occur in unlicensed frequency bands.

Figure 4:
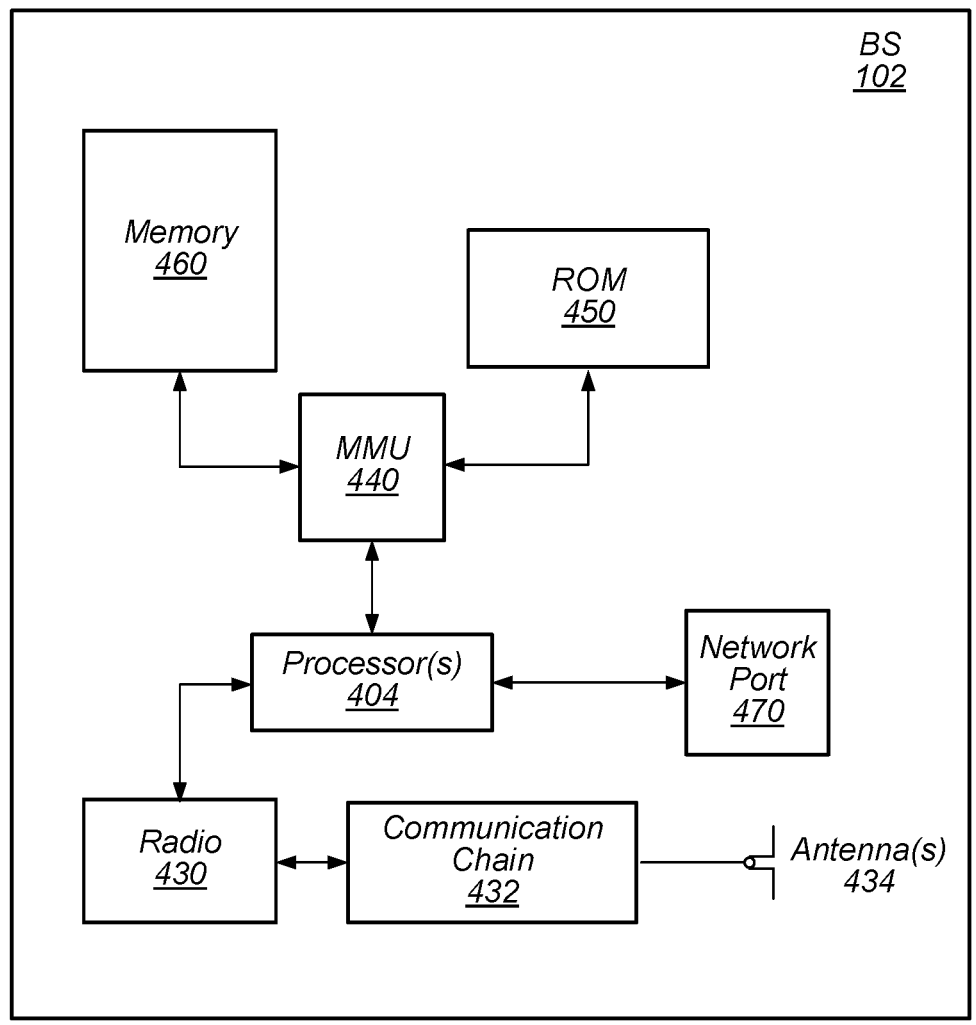
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A, NR, WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g., it may include at least one Ethernet port, and radio 430 may be designed to communicate according to the Wi-Fi standard. The base station 102 may operate according to the various methods as disclosed herein for wireless devices to perform detection of burst cellular communication in unlicensed spectrum.

Figure 5:
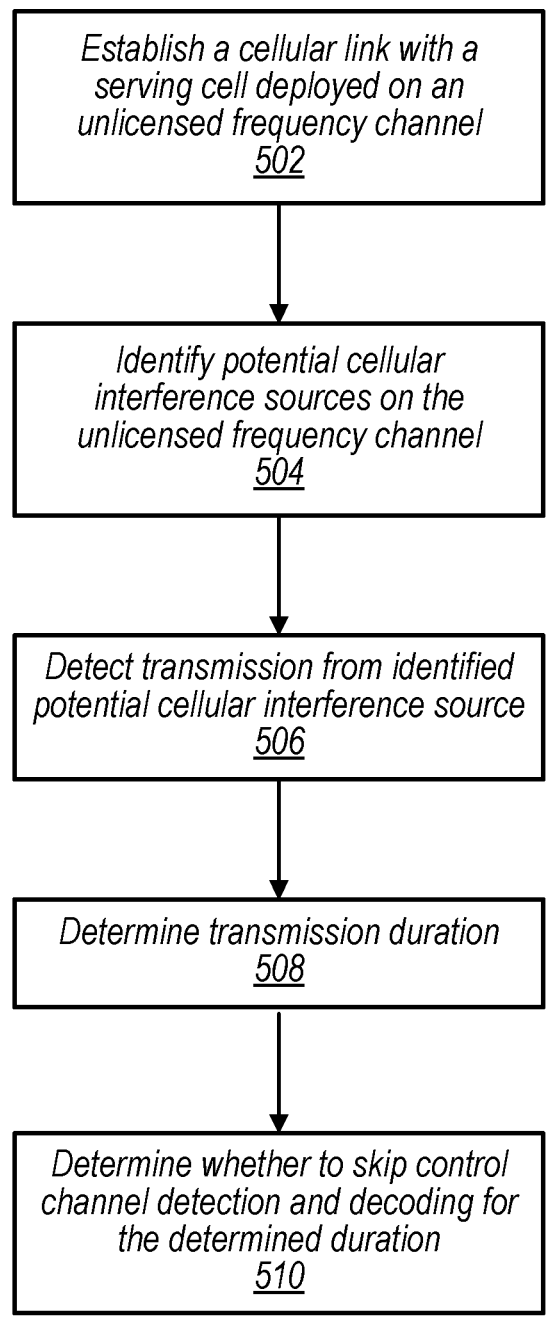
FIG. 5 is a flowchart diagram illustrating aspects of an exemplary method for performing detection of burst cellular communication in unlicensed spectrum, according to some embodiments.

FIG. 5—Flowchart Diagram

Providing coexistence features for cellular communication in unlicensed spectrum may be useful to improve quality of service obtained by wireless devices performing cellular, Wi-Fi, and/or other forms of communication in unlicensed spectrum, and/or may help improve cell capacity for carriers utilizing unlicensed spectrum. The coexistence features described herein may include or be based at least in part on use of a cellular control channel design that supports detection of potential sources of interference, and detection of interference and intended channel occupancy time by those potential sources of interference.

FIG. 5 is a flowchart diagram illustrating aspects of an exemplary possible method for performing detection of burst cellular communication in unlicensed spectrum, that may be used in conjunction with the various aspects of this disclosure, and/or that may be used in any number of other contexts, as desired.

Aspects of the method of FIG. 5 may be implemented by a wireless device, e.g., in conjunction with one or more cellular base stations, such as UE 106 and BS 102 illustrated in and described with respect to various of the Figures herein, or more generally in conjunction with any of the computer circuitry, systems, devices, elements, or components shown in the above Figures, among others, as desired. For example, a processor (and/or other hardware) of such a device may be configured to cause the device to perform any combination of the illustrated method elements and/or other method elements. Note that while at least some elements of the method of FIG. 5 are described in a manner relating to the use of communication techniques and/or features associated with NR, NR-U, and/or 3GPP specification documents, such description is not intended to be limiting to the disclosure, and aspects of the method of FIG. 5 may be used in any suitable wireless communication system, as desired. In various embodiments, some of the elements of the methods shown may be performed concurrently, in a different order than shown, may be substituted for by other method elements, or may be omitted. Additional method elements may also be performed as desired.

As shown, the method of FIG. 5 may operate as follows. In 502, the wireless device may establish a cellular link with a cellular base station. The cellular base station may provide a serving cell (a "first cell") to the wireless device on an unlicensed frequency channel. At least according to some embodiments, the first cell may be a Fifth Generation (5G) New Radio (NR) cell.

In 504, the wireless device may identify potential cellular interefence sources on the unlicensed frequency channel. This may include performing a search for other (e.g., 5G NR) cells deployed on the unlicensed frequency channel (or at least partially overlapping with the frequency channel), e.g., by monitoring a synchronization channel for synchronization information transmitted by other cells deployed on the unlicensed frequency channel. Such a search may be performed periodically, according to some embodiments, possibly with a periodicity depending at least in part on a current mobility level of the wireless device (e.g., such that a search is performed more frequently when the wireless device is more mobile/less stationary and less frequently when the wireless device is less mobile/more stationary), among various other possibilities. Based on the search, the wireless device may be able to obtain identification information for one or more other cells (e.g., including at least a "second cell", which may also be a 5G NR cell), which may include a cell identifier for each identified cell and cell timing synchronization information for each identified cell.

Note that at least in some instances, the wireless device may determine an interference level (e.g., signal strength, as one possible representation of interference level) for each cell discovered during the search for other cells deployed on the unlicensed frequency channel. Based at least in part on the determined interference level, the wireless device may further determine whether to maintain cell information for each cell discovered during the search for other cells deployed on the unlicensed frequency channel. For example, if the interference level of a cell is below a certain threshold, the wireless device might deem that cell sufficiently weak as to be unnecessary to monitor as a potential source of interference, while if the interference level of a cell is above the threshold, the wireless device might deem that cell sufficiently strong as to be worthwhile to monitor as a potential source of interference. As another example, the wireless device may determine a cell's interference level based on the relative strength of the received signal from the cell in comparison to that of the serving cell, which can be measured from the synchronization signals or other dedicated reference signals. Identifying information (e.g., cell identifiers) for those cells identified as being worthwhile to monitor may be stored by the wireless device.

In 506, the wireless device may detect a transmission from an identified potential source of cellular interference, such as the second cell. For example, the wireless device may monitor the unlicensed frequency channel at potential transmission times for the second cell (e.g., and any other cells identified during the search), where the potential transmission times for the second cell are determined based at least in part on the cell timing synchronization information for the second cell. As one possibility, the potential transmission times could include slot boundaries according to the cell timing of the second cell, and/or certain sub-slot intervals (e.g., half-slot, quarter-slot, etc.). During such monitoring, the wireless device may detect the transmission. The wireless device may be able to identify the source of the transmission, using the identification information obtained during the search for potential cellular interefence sources. For example, at least a portion (e.g., cell-specific reference signals, control channel CRC scrambling, and/or other portions) of the transmission may be identifiable using a cell identifier of the cell performing the transmission, such that the wireless device might be able to decode that portion of the transmission using the cell identifier of the second cell, to determine that the transmission is performed by the second cell.

In 508, the wireless device may determine a transmission duration (or channel occupancy time, COT) of the transmission. This may include decoding a portion of the transmission that indicates the COT of the transmission, possibly using the identification information for the cell performing the transmission. For example, the COT information may be included in control information provided as part of the transmission, which may be scrambled using a cell-specific scrambling code.

In 510, the wireless device may determine whether to skip control channel detection and decoding of the serving cell for the determined duration of the transmission. For example, the wireless device and the serving cell may be configured for frequency re-use, provided interference levels from other cells using the same frequency are low enough that communication with the serving cell remains possible. Accordingly, the wireless device may determine an interference level for the transmission, and may determine whether to skip control channel decoding for the first cell is based at least in part on the interference level for the transmission. For example, the wireless device may determine to skip control channel decoding for the serving cell for the channel occupancy time of the transmission if the interference level for the transmission is greater than an interference threshold, and may determine not to skip control channel decoding for the serving cell for the channel occupancy time of the transmission if the interference level for the transmission is less than the interference threshold. The interference threshold may be an absolute threshold (e.g., based solely on the signal strength of the transmission), or a relative threshold (e.g., based on a difference between signal strength of the transmission and signal strength of the serving cell), among various possibilities. In some instances, multiple interference thresholds may be used (e.g., an absolute threshold and a relative threshold), if desired. The interference threshold(s) may be indicated in information provided from the cellular base station, may be determined autonomously by the wireless device, may be predetermined (e.g., stored in a wireless device SIM and/or specified by a cellular communication standard associated with the cellular link), and/or may be determined in any of various other ways.

Thus, according to the techniques described herein, a wireless device may be able to detect potentially interfering cellular transmissions on unlicensed spectrum being used by the wireless device, and to determine the length of such transmissions. This may in turn allow the wireless device to reduce its power consumption by refraining from performing control channel blind decoding (and possibly operating in a reduced power/sleep mode) during transmissions that are determined to be sufficiently strongly interfering as to potentially cause the wireless device to be unable to successfully decode the control channel provided by its serving cell, at least according to some embodiments.

FIGS. 6-10—Additional Information

FIGS. 6-10 and the following information are provided as being illustrative of further considerations and possible implementation details relating to the method of FIG. 5, and are not intended to be limiting to the disclosure as a whole. In particular, FIGS. 6-10 may be illustrative of various possible features that could be implemented in 3GPP based communication systems for supporting burst communication detection in unlicensed spectrum. Numerous variations and alternatives to the details provided herein below are possible and should be considered within the scope of the disclosure.

Transmission in unlicensed spectrum is typically performed in a time division multiplexing manner. Transmitters may generally perform clear channel assessment (CCA) as well as follow a back-off mechanism before any transmission to reduce the likelihood of collisions between transmissions. If a device using such a frequency channel in unlicensed spectrum recognizes that the channel will be occupied by another device (e.g., a different serving cell, a device operating according to a different RAT, a serving cell deployed by a different network, etc.), it may be desirable (at least in some instances) for the device to operate in a reduced power mode (e.g., to go to sleep) for the duration of the channel occupancy.

To facilitate detection of channel use and efficient operation, it may be useful to support the ability of a wireless device to identify the transmitter of a transmission (e.g., including whether it is a serving cell of the wireless device) and the duration of the channel occupancy. To detect a Wi-Fi transmitter, such as a Wi-Fi access point or other station, it may be possible to perform Wi-Fi preamble detection. To detect a NR-U transmitter, such as a NR-U gNB, it may be possible to provide control channel design features (e.g., using NR-U waveforms) that can support transmitter identification and channel occupancy time, such as according to the techniques described herein.

According to such techniques, a UE may attempt to identify potential sources of interference when operating in unlicensed spectrum. Such operation may include periodically (e.g., infrequently, such as on the order of seconds, minutes, hours, etc., according to various embodiments) searching for other cells based on a synchronization channel. Such a search could include monitoring the synchronization channel for a duration that is expected to be sufficient to decode discovery signals provided by any other cells deployed on the same unlicensed frequency channel as the UE. For example, in some instances, a synchronization signal periodicity of 40 ms (or 60 ms, or 80 ms, or any other of various possible values) may be used by NR-U cells, in which case the search for synchronization signals may be performed for that duration of time.

From the synchronization signals obtained, the UE may be able to obtain cell identifier and timing information and maintain a neighbor list of NR-U cells deployed on the same frequency channel. At least in some instances, the UE may also measure the interference level (e.g., measured from the sync channel or from cell-specific reference signals) for each identified cell, and may decide whether to add the identified interfering cell to the neighbor list for monitoring. For example, the UE may autonomously decide (e.g., based on one or more internally determined thresholds) whether the interference level of an identified interfering cell is sufficient to warrant monitoring the cell's transmissions. As another possibility, the network to which the UE is attached may configure the UE with one or more interference thresholds to determine whether an identified interfering cell is sufficiently strongly interfering to add to the neighbor list. Such network configuration could be performed during RRC connection establishment, by providing broadcast information (e.g., in system information blocks), or can be pre-configured to the device (e.g., in a SIM of the device). As still another possibility, such threshold(s) could be cellular communication standard specified (e.g., in one or more technical specification (TS) documents published by 3GPP).

The threshold(s) may include an absolute threshold (e.g., an RSRP threshold above which an identified cell is added to the neighbor list and below which an identified cell is not added to the neighbor list) and/or a relative threshold (e.g., a difference in RSRP between an identified cell and the serving cell of a UE), among various possibilities. Use of multiple interference thresholds, such as using different interference thresholds to add a cell to the neighbor list or to remove a cell from the neighbor list to introduce a hysteresis effect, is also possible.

Once any other cells deployed on the same frequency channel have been identified, the UE may detect transmissions (such as from the identified sources of potential interference), e.g., based on an identification signal. Such detection may be performed in accordance with the system timing determined when identifying potential interfering cells, e.g., at slot boundaries and/or certain specified sub-slot boundaries (half-slot, quarter-slot, etc.) for each potentially interfering cell, at least according to some embodiments.

The identification signal used to identify when a transmission burst according to NR-U is occuring, and possibly to identify whether the transmission is from the serving cell of a UE or from an interfering cell. It may be beneficial for such detection to require relatively low complexity (e.g., less than for decoding control channels, as one possibility), such as by providing a simple sequence detection mechanism. Two possible approaches could include using a cell-specific identification signal or using a common identification signal for all NR-U transmissions.

As one possibility for a cell-specific identification signal, a wireless device may be able to identify a NR-U transmission burst using a cell-specific reference signal transmitted as part of the NR-U transmission burst. In order to enable use of such a signal as an identification signal, it may be the case that certain common resources (time/frequency) are specified (and thus can be known in advance) for use in each 20 MHz sub-channel for the cell-specific reference signal for any given NR-U transmission burst.

At least in some embodiments, the cell-specific reference signals used as the identification signal may include demodulation reference signals (DMRS) that are provided as part of control channel signaling, e.g., to initiate a transmission. For example, according to some embodiments, the DMRS provided by a cell may use a gold sequence initialized as follows:

$$c_{init} = (2^{17}(N_{symbol}^{slot} N_{s,f}^{\mu} + \ell + 1)(2N_{ID}+1) + 2N_{ID}) \bmod 2^{31}$$

such that the sequence generation depends on a scrambling ID (which may be the cell ID), the slot index within a frame, and the symbol index within a slot.

Thus, a wireless device may be to detect such a sequence for a neighbor cell based on having previously determined the cell ID and timing synchronization information for the neighbor cell. The wireless device may further understand that it is part of a transmission from a NR-U cell, and to identify the cell performing the transmission (e.g., including whether it is a serving cell or an interfering cell to the wireless device), e.g., based on the cell ID used as part of the sequence generation.

Figure 6:
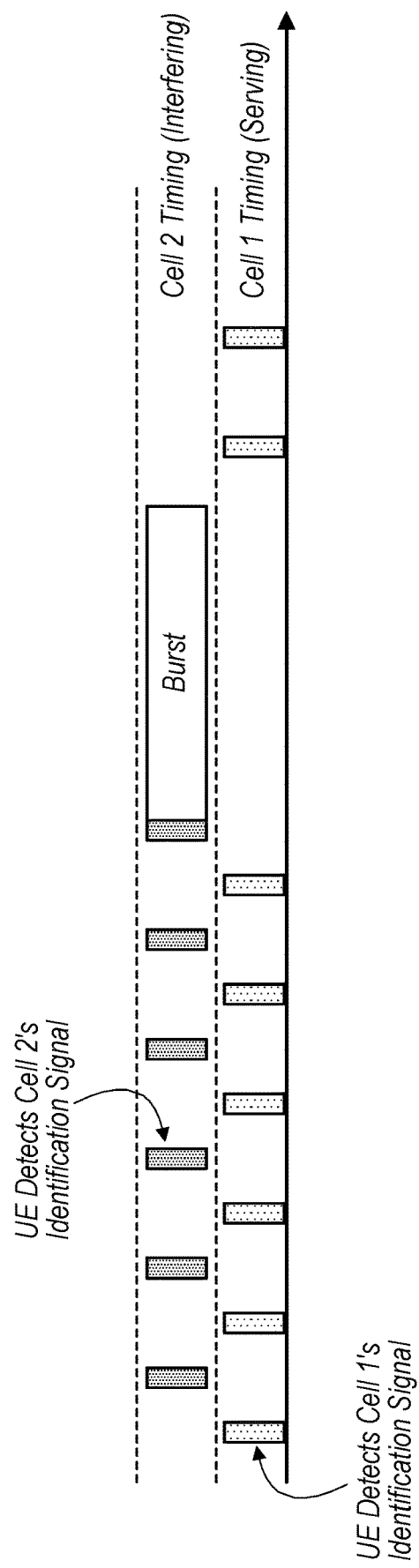
FIG. 6 illustrates aspects of an exemplary possible burst detection timeline for a wireless device performing cellular communication in unlicensed spectrum, according to some embodiments.

FIG. 6 illustrates a timeline showing an exemplary possible scenario in which such an identification signal is used by a wireless device performing cellular communication in unlicensed spectrum to perform burst detection, according to some embodiments. As shown, the UE may detect identification signals of both its serving cell (cell 1) and an interfering cell (cell 2) in accordance with the respective timing for each of those cells and based on the cell ID for each of those cells. In some instances, as shown (and as further described subsequently herein), based on detection of a burst by the interfering cell, the UE may refrain from (skip) monitoring serving cell transmissions during the burst by the interfering cell, which may reduce the power consumption of the UE for that duration of time.

According to some embodiments, the cell-specific reference signal may be wideband (e.g., may include resources that substantially span the entire channel bandwidth), e.g., to meet regulated occupied channel bandwidth (OCB) requirements for the unlicensed spectrum. To further reduce UE detection complexity, it may additionally or alternatively be useful to restrict the initial reference signal pattern at the beginning of channel occupancy of an unlicensed frequency channel by an NR-U transmission to a "1-symbol" pattern, to restrict the timing positions at which an NR-U transmission is performed (e.g., to only at slot boundaries or possibly half-slot boundaries, among various possibilities), and/or to synchronize NR-U gNBs to allow UEs to detect reference signals from different cells at the same time. Note that such synchronization could include gNBs from the same operator syncing to a certain gNB (e.g., that operates in licensed spectrum), gNBs synchronizing based on GNSS (e.g., GPS) timing, and/or any of various other possibilities.

Figure 7:
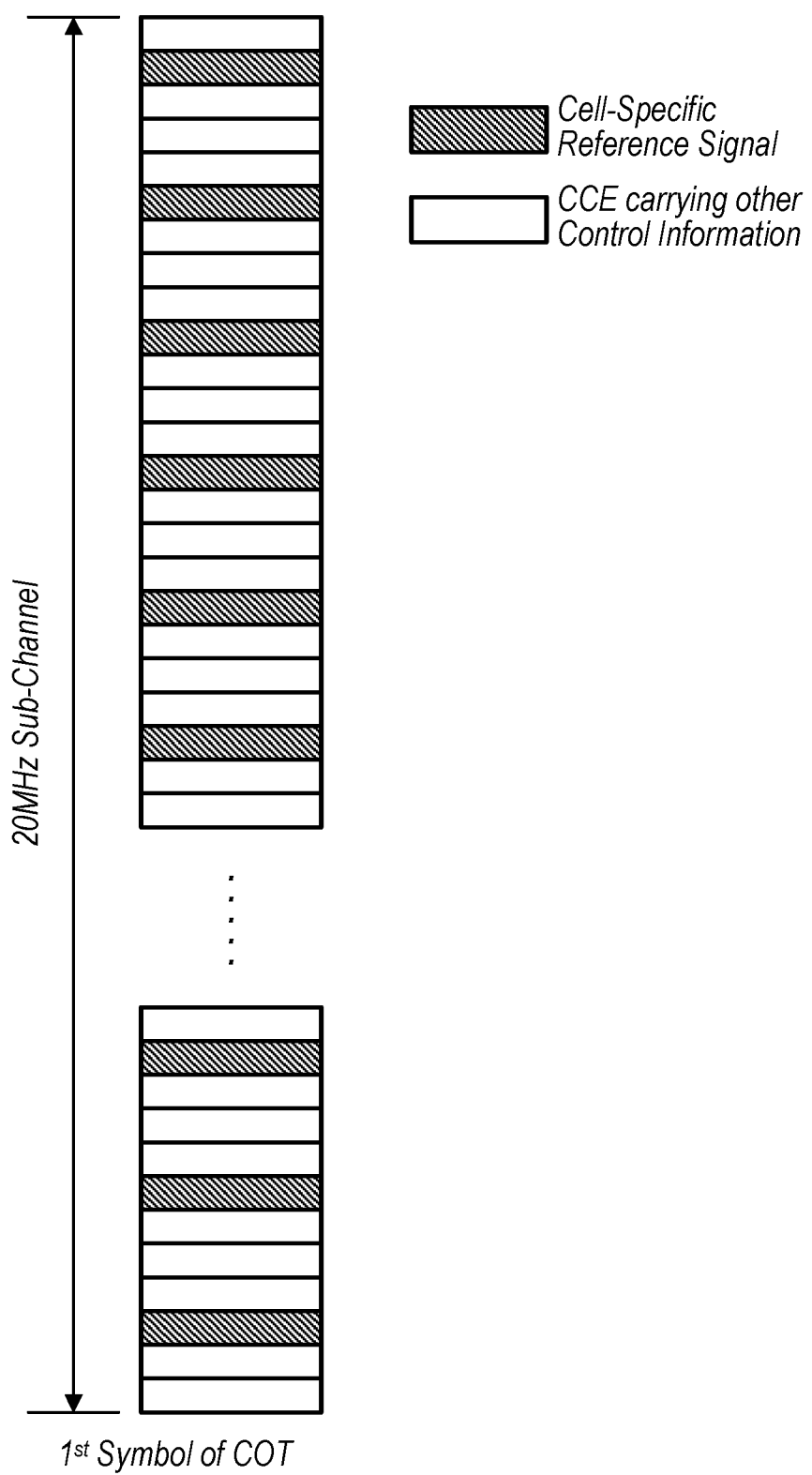
FIG. 7 illustrates aspects of an exemplary possible control channel design supporting detection of burst cellular communication in unlicensed spectrum, according to some embodiments.

FIG. 7 illustrates aspects of such an exemplary possible control channel design supporting detection of burst cellular communication in unlicensed spectrum, according to some embodiments. According to the illustrated control channel design, certain control channel elements (CCEs) (e.g., every 4th CCE, in the illustrated example) of the first symbol of the 20 MHz subchannel in use may be designated for use for the cell-specific reference signal. The remaining CCEs may be used to carry other control information. Note that numerous other control channel designs, and/or variations of the illustrated control channel design, are also possible.

As another possibility for an identification signal to assist UEs to detect NR-U transmissions, a common identification signal may be selected and implemented, such that the common identification signal is used by any NR-U transmitter to initiate a NR-U transmission, e.g., similar to a Wi-Fi preamble that may be used to initiate a Wi-Fi transmission. Use of such a common identification signal may allow a UE to avoid detecting multiple identification signals for different cells, and may thus reduce detection complexity for the UE. The common identification signal (or "NR-U preamble") could be preconfigured to UEs by storing it inside of a SIM of the UE (e.g., for an identification signal that is common to a specific operator), or directly specified by standard specification documents (e.g., for an identification signal that is common for all NR-U deployments), among various possibilities. Note that in such a case, the UE may perform cell identification (e.g., to determine if a transmission is from a serving cell or an interfering cell) separately from the initial NR-U burst detection, e.g., at a later step.

Once a UE has detected a NR-U transmission, the UE may determine the length of the NR-U transmission (e.g., the COT of the transmission). For a transmission from an interfering cell, this may be sufficient information to determine a length of time for which to skip control channel decoding (e.g., if the interfering transmission is of sufficient strength to warrant skipping control channel decoding). For a transmission from the serving cell, the UE may further determine the uplink/downlink pattern for the transmission.

There may be multiple possible control channel design options capable of supporting both such use cases. As one possibility, a new channel (or multiple new channels) may be introduced to support broadcasting of the COT length, and may be used in addition to existing techniques (e.g., use of a NR group common physical downlink control channel (NR GC-PDCCH)) for indicating an uplink/downlink pattern for the transmission. As another possibility, a modification to an existing control channel (e.g., a modified NR GC-PDCCH) to support the capability of non-served UEs to determine transmission COT may be used.

In the case of a "clean slate design" for indicating COT, a new PDCCH format for NR-U may be specified. This channel may include a cell identifier for the transmitting cell (e.g., the PDCCH may be scrambled by a pseudorandom noise (PN) sequence initialized with the cell-specific ID, or the payload bits of the PDCCH may include the cell-specific ID). The payload of this channel may also include at least the COT length. The COT length could be indicated in units of slot (e.g., 4 bits representing up to 16 slots, as one possibility), in units of half slot (e.g., 5 bits representing up to 16 slots, as one possibility), in units of absolute time (e.g., 5 bits representing up to 8 ms in units of 0.25 ms, as one possibility), among various possibilities.

In the case of the NR GC-PDCCH being used to indicate COT, since the existing NR GC-PDCCH mechanisms may target only the serving cell, certain modifications may be needed in order to support the possibility that non-served UEs can obtain the COT, at least according to some embodiments.

Figure 8:
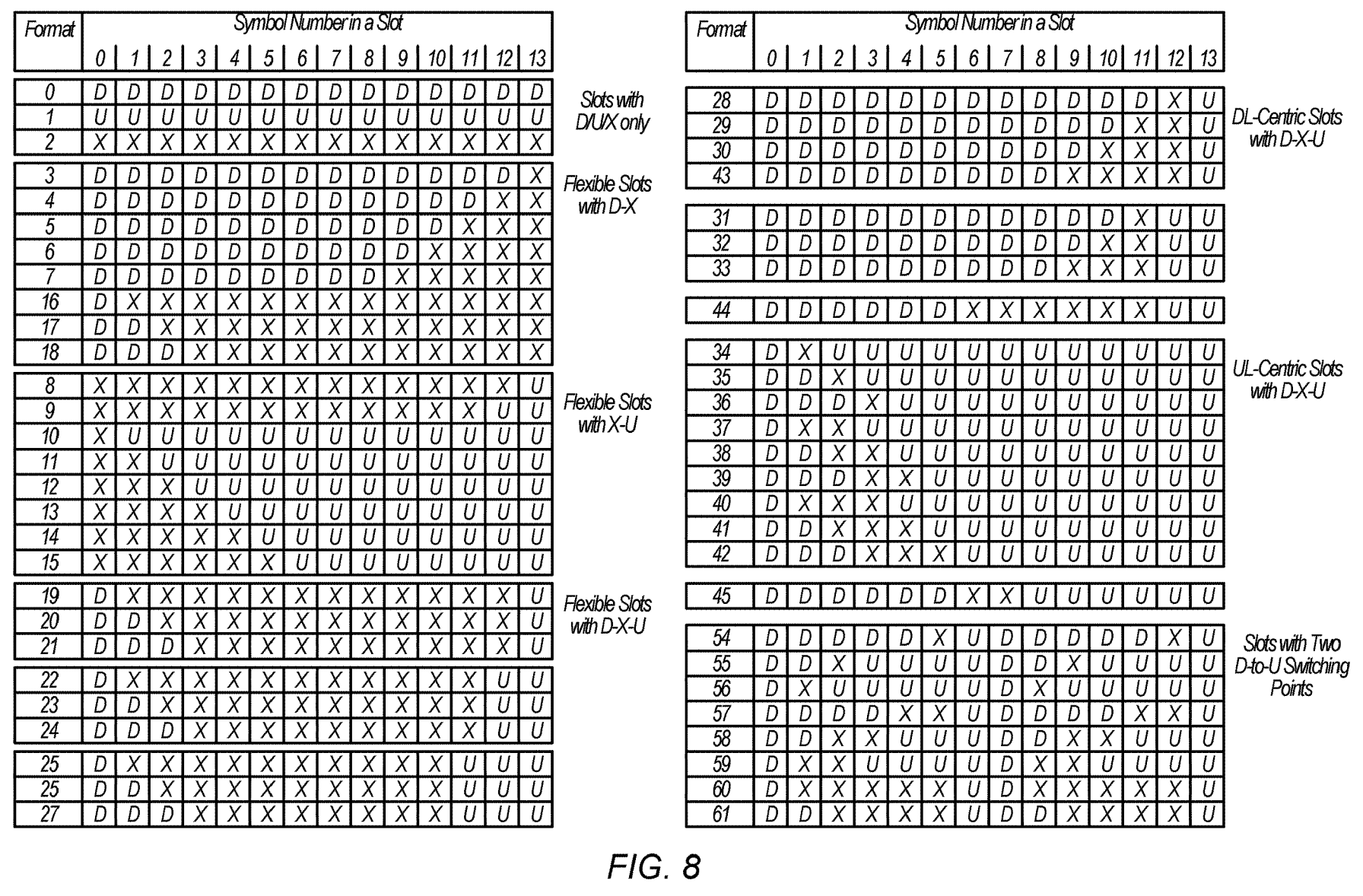

FIG. 8 illustrates a portion of an exemplary possible slot format table that could be used (e.g., in accordance with 3GPP TS 38.213 Table 4.3.2-3) to specify the uplink/downlink symbol configuration within a slot for multiple possible slot format patterns. FIG. 9 illustrates a portion of an exemplary possible slot format indicator (SFI) table that could be used in conjunction with the slot format table of FIG. 8. A SFI may be information indicating slot formats for one or more slots, and may be carried in the PDCCH DCI format 2_0 with the CRC scrambled by a SFI-RNTI, at least according to some embodiments. A monitoring periodicity (e.g., TsH={1, 2, 4, 5, 8, 10, 16, 20} slots) may be radio resource control (RRC) configured. For example, the RRC configuration for monitoring DCI Format 2_0 may include a control resource set (CORESET) to monitor the PDCCH conveying the DCI Format 2_0, a payload size for the DCI Format 2_0, location of a field to monitor (e.g., in case multiple SFIs are carried in a GC-PDCCH), a UE specific set of combinations of slot formats (also referred to as a UE specific SFI table), an aggregation level, a number of PDCCH candidates for the aggregation level, and the monitoring periodicity $T_{SFI}$. Thus, as shown, each row of the illustrated SFI table may indicate a possible configuration by specifying a concatenation of multiple slot configuration indices as specified by the slot format table of FIG. 8.

Figure 10:
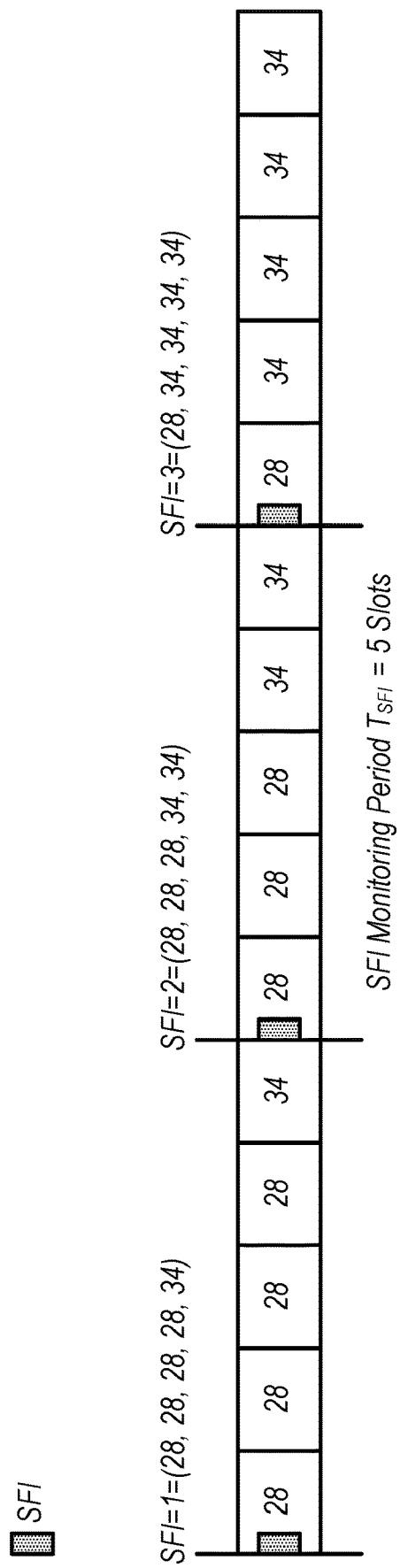
FIG. 10 is a communication timeline illustrating aspects of an exemplary possible scenario in which a slot format table and slot format indicator table such as illustrated in FIGS. 8-9 are used, according to some embodiments.

FIG. 10 is a communication timeline illustrating aspects of an exemplary scenario in which a slot format table and slot format indicator table such as illustrated in FIGS. 8-9 are used. As previously noted, the serving cell may configure a SFI table such as illustrated in FIG. 9 via RRC signaling; in the GC-PDCCH, the serving cell may indicate a row index of the configured SFI table. Thus, in the illustrated scenario, the serving cell may indicate $T_{SFI}$=1 for a first communication burst, to inform served UEs that the communication burst will last 5 slots and that the slots will have formats 28, 28, 28, 28, and 34 according to the slot format table. Similarly, the serving cell may indicate SFI=2 for a second communication burst, to inform served UEs that the communication burst will last 5 slots and that the slots will have formats 28, 28, 28, 34, and 34 according to the slot format table. Still further, the serving cell may indicate SFI=3 for a third communication burst, to inform served UEs that the communication burst will last 5 slots and that the slots will have formats 28, 34, 34, 34, and 34 according to the slot format table.

However, since non-served UEs may not receive the SFI table configuration information, it may not currently be possible to determine the COT of a transmission from the GC-PDCCH. Accordingly, as one possibility for modifying the GC-PDCCH to allow non-served UEs to determine the COT of a transmission, a fixed size header may be inserted at the beginning of the GC-PDCCH payload information to indicate the COT length. Additionally, a fixed size of total payload bits in the GC-PDCCH may be configured, e.g., so that UEs from other cells may be able to decode the GC-PDCCH without obtaining the payload size through RRC configuration. The GC-PDCCH may use a common SFI-RNTI, e.g., that a non-served UE may be able to determine using cell identification information, or that may be fixed and stored in a SIM of the UE and/or specified by standard specification documents. The GC-PDCCH may use a cell-specific scrambling code to differentiate cells, e.g., in a similar manner as may be used in licensed band operation.

Once a UE has detected a NR-U transmission from an interfering cell, the UE may determine whether to skip attempting to decode DCI from its serving cell for the length of the NR-U transmission. In some instances, the UE may always determine to skip attempting to decode DCI from its serving cell for the length of an interfering NR-U transmission. However, at least in some instances, NR-U may support frequency re-use such that multiple cells (e.g., from the same operator) may be able to operate simultaneously. Note that this may not always be guaranteed to be possible without cell planning, e.g., it may not be achievable if the neighbor cell power is too strong. Thus, the network may specify (or the UE may autonomously determine, or standard specification documents may specify) one or more interference thresholds to be used by a UE to determine whether to skip serving cell control channel decoding. For example, an absolute received power (e.g., in RSRP) threshold may be specified, such that if the interfering transmission signal strength is above the threshold, the UE may determine to skip serving cell control channel decoding for the determined COT of the interfering transmission, while if the interfering transmission signal strength is below the threshold, the UE may determine not to skip serving cell control channel decoding for the determined COT of the interfering transmission. As another example, a relative received power (e.g., in RSRP) threshold may be specified, such that if the interfering transmission signal strength is greater than the serving cell signal strength by at least the threshold, the UE may determine to skip serving cell control channel decoding for the determined COT of the interfering transmission, while if the interfering transmission signal strength is not greater than the serving cell signal strength by at least the threshold, the UE may determine not to skip serving cell control channel decoding for the determined COT of the interfering transmission.

In the following further exemplary embodiments are provided.

One set of embodiments may include a method, comprising: by a wireless device: establishing a cellular link with a cellular base station, wherein the cellular base station provides a first cell deployed on an unlicensed frequency channel; performing a search for other cells deployed on the unlicensed frequency channel; obtaining identification information for at least a second cell deployed on the unlicensed frequency channel based at least in part on the search for other cells deployed on the unlicensed frequency channel; detecting a transmission on the unlicensed frequency channel, wherein the transmission is performed by the second cell; determining that the transmission is performed by the second cell based at least in part on the indentification information for the second cell; determining a channel occupancy time of the transmission; and determining whether to skip control channel decoding for the first cell based at least in part on the transmission by the second cell.

According to some embodiments, performing the search for other cells deployed on the unlicensed frequency channel further comprises monitoring a synchronization channel for synchronization information, wherein the identification information for the second cell includes a cell identifier for the second cell and cell timing synchronization information for the second cell.

According to some embodiments, the method further comprises: monitoring the unlicensed frequency channel at a potential transmission time for the second cell, wherein potential transmission times for the second cell are determined based at least in part on the cell timing synchronization information for the second cell.

According to some embodiments, at least a portion of the transmission is identifiable using the cell identifier for the second cell, wherein determining that the transmission is performed by the second cell further comprises using the cell identifier for the second cell to decode the portion of the transmission that is identifiable using the cell identifier for the second cell.

According to some embodiments, the method further comprises: determining an interference level for each cell discovered during the search for other cells deployed on the unlicensed frequency channel; and determining whether to maintain cell information for each cell discovered during the search for other cells deployed on the unlicensed frequency channel based at least in part on the determined interference level.

According to some embodiments, determining the channel occupancy time of the transmission further comprises: decoding a portion of the transmission indicating the channel occupancy time for the transmission using the identification information for the second cell.

According to some embodiments, the method further comprises: determining an interference level for the transmission, wherein determining whether to skip control channel decoding for the first cell is further based at least in part on the determined interference level for the transmission.

According to some embodiments, determining whether to skip control channel decoding for the first cell further comprises: determining to skip control channel decoding for the first cell for the channel occupancy time of the transmission if the interference level for the transmission is greater than an interference threshold; and determining not to skip control channel decoding for the first cell for the channel occupancy time of the transmission if the interference level for the transmission is less than the interference threshold.

According to some embodiments, the method further comprises: receiving information indicating the interference threshold from the cellular base station.

According to some embodiments, determining the channel occupancy time of the transmission further comprises: receiving and decoding a control channel portion of the transmission that is configured to indicate the channel occupancy time of the transmission, wherein the control channel portion is separate from a group common physical downlink control channel (GC-PDCCH) portion of the transmission.

According to some embodiments, determining the channel occupancy time of the transmission further comprises: receiving and decoding a channel occupancy time field of a group common physical downlink control channel (GC-PDCCH) portion of the transmission.

According to some embodiments, the first cell is a Fifth Generation (5G) New Radio (NR) cell, wherein the second cell is also a 5G NR cell.

A further exemplary embodiment may include a wireless device, comprising: an antenna; a radio coupled to the antenna; and a processing element operably coupled to the radio, wherein the device is configured to implement any or all parts of the preceding examples.

Another exemplary embodiment may include an apparatus, comprising a processor configured to implement any or all parts of the preceding examples.

Yet another exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

A yet further exemplary set of embodiments may include an apparatus comprising means for performing any or all of the elements of any of the preceding examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
by a wireless device:
establishing a cellular link with a cellular base station, wherein the cellular base station provides a first cell deployed on an unlicensed frequency channel;
decoding a channel occupancy time field of a group common physical downlink control channel (GC-PDCCH); and
determining, based on the channel occupancy time field, a channel occupancy time associated with a second cell deployed on the unlicensed frequency channel, wherein the association of the channel occupancy time with the second cell is based on information in a payload of the GC-PDCCH.

2. The method of claim 1,
wherein the method further comprises performing a search for other cells deployed on the unlicensed frequency channel, wherein performing the search for other cells deployed on the unlicensed frequency channel further comprises monitoring a synchronization channel for synchronization information,
wherein identification information for the second cell includes a cell identifier for the second cell and cell timing synchronization information for the second cell.

3. The method of claim 2, wherein the method further comprises:
monitoring the unlicensed frequency channel at a potential transmission time for the second cell, wherein potential transmission times for the second cell are determined based at least in part on the cell timing synchronization information for the second cell.

4. The method of claim 2,
wherein the method further comprises detecting a transmission, wherein at least a portion of the transmission is identifiable using a cell identifier for the second cell,
wherein the method further comprises using the cell identifier for the second cell to decode the portion of the transmission that is identifiable using the cell identifier for the second cell.

5. The method of claim 1, wherein said
decoding is performed using identification information for the second cell.

6. The method of claim 1, further comprising:
determining whether to skip control channel decoding for the first cell based at least in part on the channel occupancy time associated with the second cell.

7. The method of claim 1, further comprising:
determining whether to skip control channel decoding for the first cell based at least in part on the GC-PDCCH.

8. A wireless device, comprising:
a radio; and
a processor operably coupled to the radio and configured to cause the wireless device to:
establish a cellular link with a cellular base station, wherein the cellular base station provides a first cell deployed on an unlicensed frequency channel;

decode a channel occupancy time field of a group common physical downlink control channel (GC-PDCCH); and determine, based on the channel occupancy time field, a channel occupancy time associated with a second cell deployed on the unlicensed frequency channel, wherein the association of the channel occupancy time with the second cell is based on information in a payload of the GC-PDCCH.

9. The wireless device of claim 8, wherein the processor is further configured to cause the wireless device to perform a search for other cells deployed on the unlicensed frequency channel, wherein performing the search for other cells deployed on the unlicensed frequency channel further comprises monitoring a synchronization channel for synchronization information, wherein identification information for the second cell includes a cell identifier for the second cell and cell timing synchronization information for the second cell.

10. The wireless device of claim 9, wherein the processor is further configured to cause the wireless device to:
monitor the unlicensed frequency channel at a potential transmission time for the second cell, wherein potential transmission times for the second cell are determined based at least in part on the cell timing synchronization information for the second cell.

11. The wireless device of claim 9, wherein the processor is further configured to cause the wireless device to:
detect a transmission, wherein at least a portion of the transmission is identifiable using a cell identifier for the second cell; and
use the cell identifier for the second cell to decode the portion of the transmission that is identifiable using the cell identifier for the second cell.

12. The wireless device of claim 8, wherein said decoding is performed using identification information for the second cell.

13. The wireless device of claim 8, wherein the processor is further configured to cause the wireless device to:
determine whether to skip control channel decoding for the first cell based at least in part on the channel occupancy time associated with the second cell.

14. The wireless device of claim 8, wherein the processor is further configured to cause the wireless device to:
determine whether to skip control channel decoding for the first cell based at least in part on the GC-PDCCH.

15. An apparatus, comprising:
a processor configured to cause a wireless device to:
establish a cellular link with a cellular base station, wherein the cellular base station provides a first cell deployed on an unlicensed frequency channel;
decode a channel occupancy time field of a group common physical downlink control channel (GC-PDCCH); and
determine, based on the channel occupancy time field, a channel occupancy time associated with a second cell deployed on the unlicensed frequency channel, wherein the association of the channel occupancy time with the second cell is based on information in a payload of the GC-PDCCH.

16. The apparatus of claim 15, wherein the processor is further configured to cause the wireless device to perform a search for other cells deployed on the unlicensed frequency channel, wherein performing the search for other cells deployed on the unlicensed frequency channel further comprises monitoring a synchronization channel for synchronization information, wherein identification information for the second cell includes a cell identifier for the second cell and cell timing synchronization information for the second cell.

17. The apparatus of claim 16, wherein the processor is further configured to cause the wireless device to:
detect a transmission, wherein at least a portion of the transmission is identifiable using a cell identifier for the second cell; and
use the cell identifier for the second cell to decode the portion of the transmission that is identifiable using the cell identifier for the second cell.

18. The apparatus of claim 15, wherein said decoding is performed using identification information for the second cell.

19. The apparatus of claim 15, wherein the processor is further configured to cause the wireless device to:
determine whether to skip control channel decoding for the first cell based at least in part on the channel occupancy time associated with the second cell.

20. The apparatus of claim 15, wherein the processor is further configured to cause the wireless device to:
determine whether to skip control channel decoding for the first cell based at least in part on the GC-PDCCH.

* * * * *